Dec. 10, 1957     K. WETZEL     2,815,661
GAS METER
Filed Oct. 11, 1954
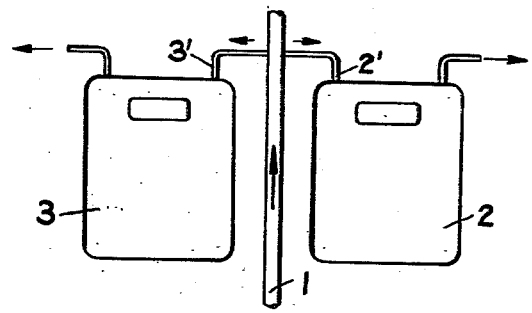
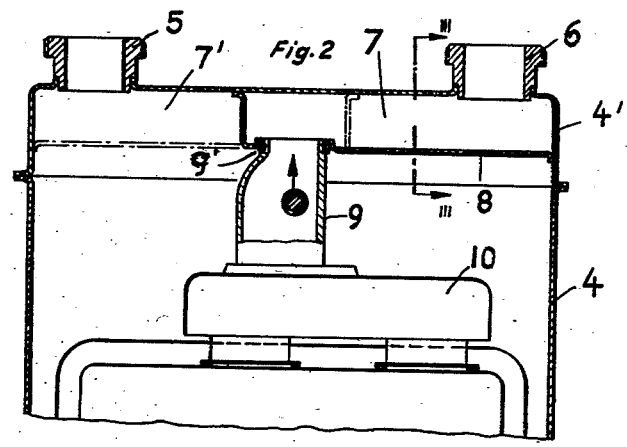
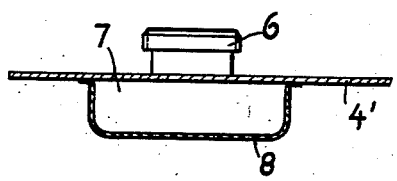

United States Patent Office 2,815,661
Patented Dec. 10, 1957

2,815,661

GAS METER

Karl Wetzel, Osnabruck, Germany, assignor to G. Kromschroder Aktiengesellschaft, Osnabruck, Germany Application October 11, 1954, Serial No. 461,348

2 Claims. (Cl. 73—273)

This invention relates to new and useful improvements in gas meters and more particularly to a gas meter having a housing with two pipe connections, of which one is in communication with the interior of the housing and the other one with the measuring movement of the meter. One of these pipe connections being used in known manner as a gas-supply connection from the gas main, whereas the other one is connected to the supply line leading to the place of consumption.

Gas meters of this type are already known, but they possess certain disadvantages. Thus it is very often the case that the rising gas main to which the gas meter is to be connected, is not located on the particular side on which the gas-intake connection of the gas meter is located. Such cases usually necessitate relatively complex and expensive pipe fitting and result in crossed connecting pipes.

It is therefore the primary object of the present invention to overcome the above mentioned difficulty by providing a gas meter which is so designed that it—without substantial changes of its interior structure and without any changes to its measuring movement—may readily be produced and supplied with left-hand or right-hand gas-intake connections as occasion may require.

To this end the present invention comprises a gas meter in which the pipe connections are so arranged at the meter housing that they are symmetrical with the gas-outlet connection of the measuring movement located in the interior of the meter housing and a conduit is formed between one of said pipe connections and said gas-outlet connection of the measuring movement by a suitably formed conducting member. Gas meters constructed in accordance with the present invention in which the gas-intake connection is arranged at the left-hand side, differ from those with right-hand gas-intake connections only by the arrangement of the conducting member. Nothing at all need be changed on both the measuring movement and the meter housing. With this symmetrical arrangement, the same conducting member, when appropriately formed, may be used for both types of gas meters, that is, for those with left-hand as well as those with right-hand gas-intake connections. The outstanding advantage is greater simplicity of gas meter structure and the resulting economy that is effected by not having to build so many different component parts for left-hand and right-hand assemblies as formerly.

Other objects and features of the invention will become apparent from the following description taken in connection with the accompanying drawings which illustrate one embodiment of the invention by way of example. It is, however, to be understood that this embodiment is typical only and that changes and modifications can be made without departing from the invention as defined in the claims.

In Fig. 1 is shown a rising gas main 1. Connected to the gas main 1 at either side are gas meters 2 and 3. But this simple gas-supply pipe arrangement shown is possible only when both the left-hand connection 2' of the gas meter 2 and the right-hand connection 3' of the gas meter 3 are formed as gas-intake connections.

In Fig. 2 is shown a meter housing 4 having a cover 4' on which are gastight mounted two connecting pieces 5, 6. In the arrangement shown in solid lines, the connecting piece 5 is in communication with the interior of the housing 4, whilst the connecting piece 6 opens into a conduit 7 formed by a sheet-metal channel 8 attached to the inside wall of the cover 4' (Fig. 3).

Symmetrically arranged with respect to the connecting pieces 5, 6 is a duct 9 which is gastight connected to the sheet-metal channel 8 and on its one end in communication with the measuring movement 10 of the meter and on its other end with the conduit 7.

When the gas meter is so assembled that the connecting piece 5 is adapted for use as gas-intake connection, the inflowing gas fills then the interior proper of the meter housing and is then in known manner conducted through the measuring movement 10 and leaves the gas meter as measured gas via duct 9 and conduit 7 through the gas-outlet connection 6. However, in accordance with the invention the gas meter can also be assembled in a manner whereby the channel 8 is moved 180 degrees from its present location to the one indicated by the dotted lines (Fig. 2) so that a conduit 7' leading from the duct 9 to the connecting piece 5 is formed. This is accomplished by orienting duct member or conduit 8 within cover 4' to connect with either connection 5 or 6, as desired and depending upon which is to be the meter outlet, and fixing, as by soldering, in this position in the cover. This top assembly is then placed upon the housing 4 with the proper orientation with reference to the meter mechanism, and then soldering or otherwise suitably affixing the top to the housing with a gas-tight joint. A resilient gasket 9', which may be cemented to either duct 9 or channel 8, serves to provide a gas-tight joint between these two members as the channel 8 slides down at the flanged opening therein upon the end of fixed duct 9 with gasket 9' interposed. Thus, without necessitating altering or changing-over of the measuring movement of the meter, the gas can enter through the right-hand connection 6 and leave the meter as measured gas through the left-hand connection 5. Consequently, left-hand and right-hand gas meters differ from each other only by the 180 degrees displaced location of the channel member 8. This means that also for series production there will be no difficulty to produce gas meters with left-hand or right-hand connections as occasion, or local installation conditions, may require. Gas meters made in this way are less expensive both to produce and install.

If the cover 4' of the housing 4 is formed absolutely symmetrical and the duct 9 is arranged in the axis of symmetry of the housing, it is possible to obtain a left-hand gas meter out of a right-hand one by merely turning the cover 4' together with the built in sheet-metal body 8 180°.

Of course the invention is also applicable in this kind of gas meters which have the gas first conduced to the measuring movement and the measured gas let out from the space of the meter housing, in which case, as will be understood, the conduit 7 would then become an inlet connection.

What I claim is:

1. In a gas meter embodying a housing and a gas measuring device therein, that improvement comprising a duct communicating with said device and having its axis centrally arranged in said housing, a cover for the housing extending transversely of said duct and symmetrically arranged about said axis, a conduit arranged in said cover in communication with said duct, an inlet connection and an outlet connection carried by said cover at opposite sides of the housing, one of said connections being in communication with said conduit, and adjustable interengaging gas-tight means carried jointly by the conduit and the duct whereby said conduit may be arranged selectively within said cover to connect one of the connections carried by said cover on either side of said housing with said duct.

2. In a gas meter embodying a housing and a gas measuring device therein, that improvement comprising a duct communicating with said device and having its axis centrally arranged in said housing, a cover for the housing extending transversely of said duct and having inlet and outlet connections on opposite sides of the duct, a partition arranged in said cover and forming a conduit communicating with said duct and a first of said connections while leaving the second of the connections exposed to the space within the housing, the dimension of the partition adapting it equally for opposite positioning in which it forms a conduit communicating with the duct and second connection while leaving the first exposed to the space within the housing, and gas-tight assembly connection means carried jointly by the conduit and the duct whereby the cover may be assembled on the housing with the partition in either position.

References Cited in the file of this patent
FOREIGN PATENTS

| | | |
|---|---|---|
| 287,650 | Great Britain | Mar. 29, 1928 |
| 439,654 | Great Britain | Dec. 11, 1935 |